Aug. 16, 1932.   S. H. COWIN   1,872,251
BEARING ASSEMBLY
Filed Oct. 20, 1930

INVENTOR
Stuart H. Cowin.

BY
ATTORNEY

Patented Aug. 16, 1932

1,872,251

UNITED STATES PATENT OFFICE

STUART H. COWIN, OF PITTSBURGH, PENNSYLVANIA, ASSIGNOR TO WESTINGHOUSE ELECTRIC & MANUFACTURING COMPANY, A CORPORATION OF PENNSYLVANIA

BEARING ASSEMBLY

Application filed October 20, 1930. Serial No. 489,803.

My invention relates to roller-bearings and particularly to such bearings as are intended for use on railway rolling stock.

Prior to my invention considerable difficulty has been experienced in applying roller bearings to the motors and other rotating parts of railway rolling stock. Among the foremost of the difficulties encountered have been the shifting of bearings under the thrust incidental to operation on non-level sections of the trackage or when operating on curves and the leakage of lubricant generally under the same operating conditions. The substitution of grease for oil as a lubricant was an improvement but did not eliminate the trouble. In order to effectively seal the lubricant it has been necessary to encroach seriously on the very limited space available.

My invention relates to a bearing assembly in which the parts are so proportioned and arranged that the bearing races are maintained in position and the lubricant effectively sealed while using a greatly reduced space thereby permitting a much more economical motor installation.

It is an object of my invention to provide an improved bearing which shall ensure ease of assembly, positive means of retaining the bearing in axial position and improved means for retaining lubricant and excluding foreign matter.

Figure 1:
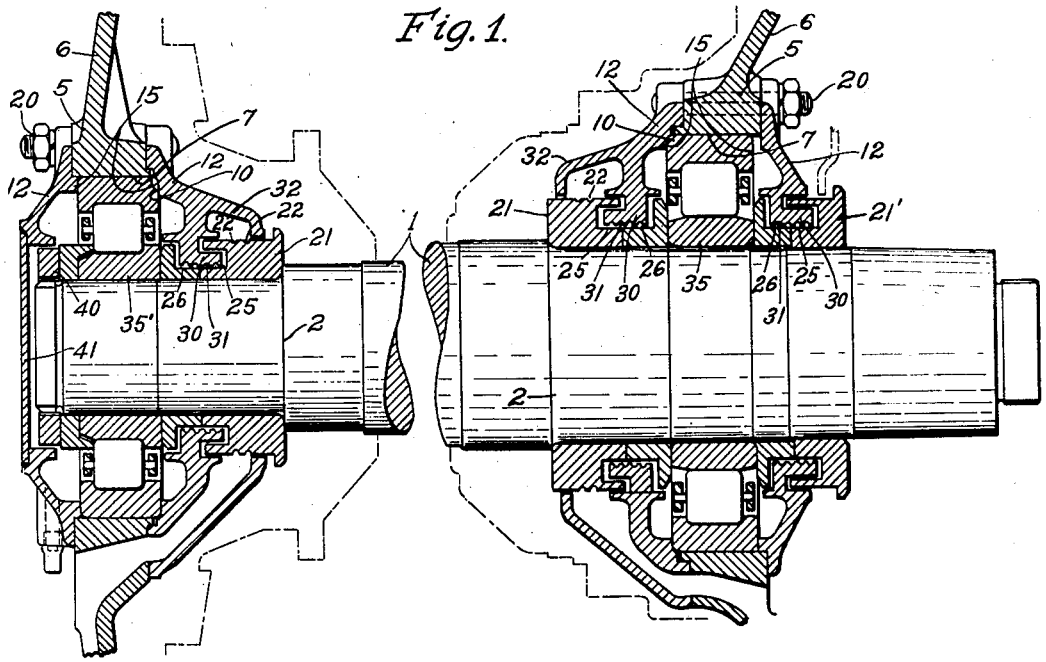
Figure 2:
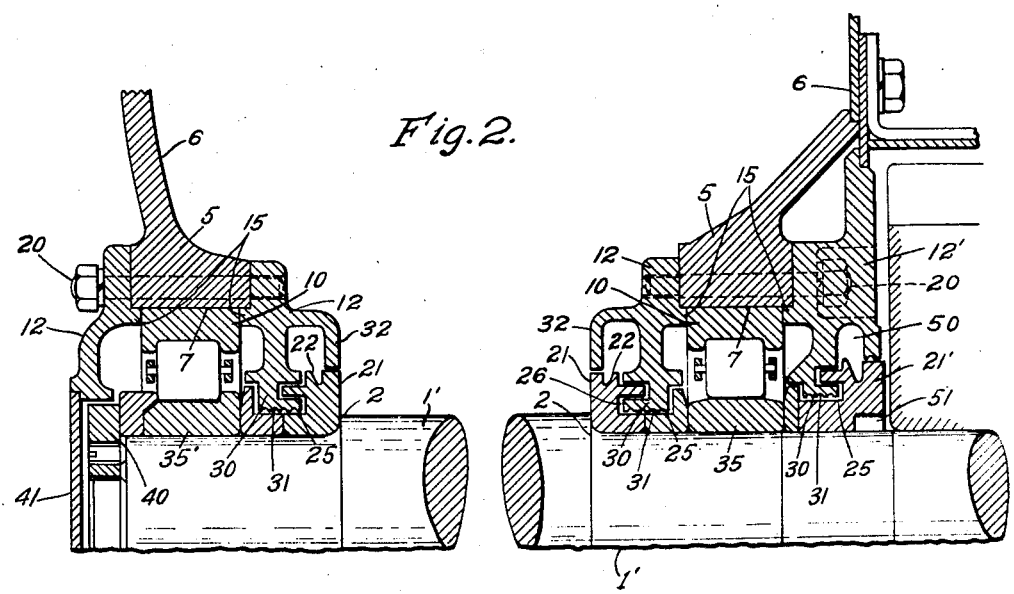

Other objects and advantages of my invention will be apparent from the following detailed description, taken in conjunction with the accompanying drawing; in which, Figure 1 is an elevation of a motor shaft having my improved bearings, shown in section as applied thereto, and Fig. 2 is a similar view of a slight modification of my invention.

The apparatus disclosed in the drawing comprises a shaft 1 adapted to receive the rotor of a railway driving motor. This shaft is preferably of stepped cross section to facilitate assembly of the rotor laminations on the shaft. At each end of the rotor, the shaft 1 is provided with a collar 2, in this case, an integral part of the shaft against which my bearing assembly will be seated.

The bearing assembly proper comprises a bearing housing 5 preferably made integral with the end bracket 6 of the motor. The bearing housing is provided with a seat 7 to receive the outer race 10 of an anti-friction bearing without the use of shims or other positioning means. At each side of the bearing seat 7 is provided a guard 12 which serves the double purpose of providing thrust-bearing seats 15 to retain the outer bearing race 10 in its position on the bearing seat 7, and providing a lubricant seal for the bearing. The guards 12 are preferably detachably connected to the bearing housing 5 by screws or bolts 20. Cooperating with the guards 12 are bi-part sealing rings. The outer portion 21 of the sealing ring nearest to the motor is provided with peripheral oil-throwing grooves 22. Also, the inner face of the ring is provided with an annular undercut groove 25. The remaining portion of the ring is provided with an annular channel 26 which, in conjunction with the under-cut groove 25 of the first portion, provides an L-shape sealing groove. The guard member 12 is provided with an L-shape flange 30 extending into the L-shape groove to form a labyrinth-like passage to retard the movement of lubricant past the sealing ring. The inner periphery of the L-shape flange is preferably provided with a plurality of annular grooves 31 to assist in retarding the motion of lubricant past the sealing rings. To further retard any lubricant motion, the sealing groove may be filled with a heavy grease. The guard on the side of the bearing nearest the motor is preferably provided with an overhanging oil-collecting flange 32 to provide an oil-collecting chamber which is preferably in communication with an oil-collecting sump or else directly connected to the outside of the motor housing so that any lubricant that works past the sealing ring will be discharged outside of the motor housing in such manner as to prevent such lubricant from reaching the windings of the motor.

The inner bearing race 35 is secured on the shaft between the sealing rings which prevent axial movement of the inner race in the same manner that the guards 12 prevent axial movement of the outer race. Any desired form of bearing element may be utilized but I prefer to employ a cylindrical roller bearing.

In assembling my bearing, I prefer to assemble the inner sealing ring, the bearing race and the inner portion of the outer sealing ring with a light shrunk fit in order to retain them in place on the shaft against moderate thrusts, while the outer portion 21' of the outer bearing ring is preferably assembled with a heavy shrunk fit to prevent displacement of the bearing by any accidental end pressure.

The description so far has been directed to the assembly at the pinion end of the shaft. However, the assembly at the dead end of the shaft differs but slightly. The inner race 35' is of the thrust-carrying type to take any thrust that may result from any cause, such as tracks not being level or when operating on a curve. Also, the outer sealing ring is replaced by a threaded nut 40. This replacement of the sealing ring by the nut 40 makes it possible to eliminate the L-shape flange 30, and seal the bearing by a plate 41.

The modification shown in Fig. 2 differs from that of Fig. 1 mainly in that the shaft 1' is of uniform diameter instead of being stepped. The guard 12' on the pinion end of the shaft is extended to provide a lubricant-receiving channel 50 similar to that in the motor side of the bearing. Since the lubricant channel precludes access to the outside of the ring, a screw connection 51 is provided to permit attaching of a puller to remove the ring when it is desired to disconnect the bearing.

I do not desire to restrict myself to the specific embodiment of my invention herein shown and described, since it is evident that it may be changed and modified without departing from the spirit and scope of my invention, as defined in the appended claims.

I claim as my invention:

1. A lubricant seal for a railway motor bearing comprising a shaft, a sealing ring secured to the shaft, said ring having an L-shape channel in the circumference thereof and oil throwers outside said groove, a bearing housing, a guard secured to the bearing housing, an L-shape sealing flange on said guard and received in the channel of said ring, an over-hanging lubricant-collecting device on said guard, said lubricant-collecting device cooperating with said oil throwers to collect any lubricant that may escape past said sealing flange.

2. A bearing seal for a dynamo-electric machine comprising a bearing housing adapted to directly receive the outer bearing race, a shaft extending through the housing, an inner sealing ring shrunk on said shaft, said sealing ring having an L-shape sealing groove, a sealing member secured to said housing and having an angular projection substantially filling said sealing groove, said sealing member being provided with a lubricant-collecting chamber, a roller bearing having the inner race shrunk on said shaft and the outer race received in said housing, a second sealing member secured to said housing, said sealing members forming axial supports for said outer race, means on said shaft, to retain said bearing in place and means cooperating with said second sealing member to retain lubricant in said bearing.

3. A bearing assembly for a motor shaft, comprising an integral collar on said shaft, a bipart lubricant-sealing ring shrunk on said shaft against said collar, said sealing ring having an L-shape sealing groove therein and oil throwing grooves on the periphery thereof, an inner race shrunk on said shaft and against said sealing ring, a second bipart sealing ring having an L-shape sealing groove therein shrunk on said shaft, the outer portion having a heavy shrunk fit to hold said parts in place on said shaft, a bearing housing about said shaft, an outer race bearing directly on said housing, roller-bearing members between said inner and said outer races, detachable sealing members secured to said housing and having annular sealing flanges cooperating with said bipart rings to seal said bearing.

4. A bearing mounting comprising a bearing seat integral with a bearing bracket, said seat being adapted to receive the outer race of an anti-friction bearing, a guard detachably secured to said bracket at each end of said seat, said guards having means for preventing axial motion of said outer race and securing means extending through said housing for securing both of said guards in place, a shaft extending through the bearing, a compound sealing ring at each side of the bearing, said ring having a labyrinth groove therein, skirts on said guards extending toward the rings, annular flanges on said skirts interfitting with said rings for producing labyrinth seals, said flange having a plurality of grooves adapted to receive a sealing grease.

5. A bearing for a railway motor comprising a bearing seat, a roller bearing element on the seat, a shaft extending therethrough, and a labyrinth seal on each side of the bearing comprising a guard attached to the bearing seat in oil-tight relation thereto, said guard having an annular flange surrounding the shaft, and a split ring in oil-tight relation with the shaft having portions interfitting with the annular flange to provide a labyrinth running joint.

In testimony whereof, I have hereunto subscribed my name this 15th day of October, 1930.

STUART H. COWIN.